United States Patent [19]
Vogel

[11] Patent Number: 5,790,858
[45] Date of Patent: Aug. 4, 1998

[54] METHOD AND SYSTEM FOR SELECTING INSTRUMENTATION POINTS IN A COMPUTER PROGRAM

[75] Inventor: Keith Randel Vogel, Duvall, Wash.

[73] Assignee: Microsoft Corporation, Redmond, Wash.

[21] Appl. No.: 268,444

[22] Filed: Jun. 30, 1994

[51] Int. Cl.$^6$ ...................................................... G06F 9/44
[52] U.S. Cl. ...................................... 395/704; 395/183.11
[58] Field of Search ....................... 371/16, 19; 395/700, 395/704, 183.11, 183.14

[56] References Cited

U.S. PATENT DOCUMENTS

| | | | |
|---|---|---|---|
| 3,427,443 | 2/1969 | Apple et al. | 371/19 X |
| 3,551,659 | 12/1970 | Forsythe | 371/19 X |
| 4,819,233 | 4/1989 | DeLucia et al. | 371/19 |

OTHER PUBLICATIONS

Robert Endre Tarjan, "Minimum Spanning Trees," *Data Structures and Network Algorithms*, Chapter 6, 1983, pp. 71–83.
James R. Larus et al., "Rewriting Executable Files to Measure Program Behavior," *University of Wisconsin Computer Sciences Technical Report 1083*, 1992, pp. 1–17.
Thomas Ball et al., "Optimally Profiling and Tracing Programs," *University of Wisconsin Computer Sciences Technical Report 1031*, 1991, pp. 1–27.
Vivek Sarkar, "Determining Average Program Execution Times and their Variance," *Proceedings of SIGPLAN '89 Conference on Programming Language Design and Implementation, SIGPLAN Notices*, vol. 24, No. 7, Jul. 1989, pp. 298–312.
Karl Pettis et al, "Profile Guided Code Positioning," *Proceedings of the ACM SIGPLAN '90 Conference on Programming Language Design and Implementation*, Jun. 20–22, 1990, pp. 16–27.

"Using Profile Information to Assist Classic Code Optmizations", Chang et al, Soft. Practice & Experience, vol. 21(12), 1301–1321, Dec. 1991.
"Improving UNIX Kernel Performance Using Profile Based Optimization", Speer et al., 1994 Winter USENIX, Jan. 17–21, 1994, pp. 181–188.
Larus et al., "Rewriting Executable Files to Measure program Behavior", Univ. of Wisconsin Comp. Sci. Tech. Report, 1991, pp. 1–27.
"Rewriting Executable Files to Measure Program Behavior", Larus et al., Univ. of Wisconsin Comp. Sci. Tech. Report 1083, 1992, pp. 1–17.
"Optimally Profiling and Tracing Programs", Ball et al., Tech. Report #1031, Univ. of Wisconsin, Sep. 1991.
"Data Structures and Algorithms", Aho et al., Addison–Wesley, 1987, pp. 215–218 (Section 6.5).

*Primary Examiner*—Emanuel T. Voeltz
*Assistant Examiner*—Kakali Chaki
*Attorney, Agent, or Firm*—Seed and Berry LLP

[57] ABSTRACT

The present invention provides a method in a computer system for selecting instrumentation points in a computer program. Instrumentation points are locations within the computer program at which instrumentation code is inserted. The method includes identifying code portions such as basic blocks in the computer program code, creating a control flow graph out of the code portions, generating a spanning tree for the control flow graph, and then selecting those edges of the control flow graph which are not a part of the spanning tree as instrumentation points. After instrumentation points are selected, instrumentation code may be added at those locations. When the computer program is executed, the added instrumentation code records execution information such as how many times an instrumentation point is accessed during execution of the computer program. Using the recorded execution information and direction specified in the control flow graph, execution information for the non-instrumented blocks may then be calculated.

9 Claims, 11 Drawing Sheets

METHOD AND SYSTEM FOR SELECTING INSTRUMENTATION POINTS IN A COMPUTER PROGRAM

TECHNICAL FIELD

The present invention relates generally to a method of and a system for determining the flow of execution for a computer program, and more particularly, to a method of and system for selecting instrumentation points in a computer program.

BACKGROUND OF THE INVENTION

Many conventional computer systems utilize virtual memory. Virtual memory refers to a set of techniques that provide a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, but these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used is the working set model. At any instance in time, t, there exists a working set, w(k, t), consisting of all the pages used by the k most recent memory references. The operating system monitors the working set of each process and allocates each process enough page frames to contain the process' working set. If the working set is larger than the allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make an optimal placement of code portions within an executable module. This is because the information required can only be obtained by actually executing the executable module and observing its usage of code portions. Clearly this cannot be done before the executable module has been created. The executable module initially created by the compiler and linker thus has code portions laid out without regard to their usage.

As each code portion is executed, the page in which it resides must be in physical memory. Other code portions residing on the same page will also in memory, even if they may not be executed in temporal proximity. The result is a collection of pages in memory with some required code portions and some unrequited code portions. To the extent that unrequired code portions are loaded into memory by this process, valuable memory space is wasted, and the total number of pages loaded into memory is much larger than necessary.

To make a determination as to which code portions are "required" and which code portions are "unrequired," a developer needs execution information for each code portion, for example, whether the code portion is accessed or how many times the code portion is accessed during execution of the computer program. A common method for gathering execution information includes adding instrumentation code to every code portion. Each time the code portion is accessed during execution of the computer program, the instrumentation code causes a flag to be set or a counter to be incremented. Unfortunately, adding instrumentation code to every code portion lengthens the computer program and slows execution.

SUMMARY OF THE INVENTION

The present invention provides a method in a computer system for selecting instrumentation points in a computer program. Instrumentation points are locations within the computer program at which instrumentation code is inserted. By selecting only certain blocks as instrumentation points, the present invention minimizes the amount of instrumentation code that must be added to the computer program. The method for selecting instrumentation points includes creating a control flow graph for the computer program, creating a spanning tree for the control flow graph, and then selecting edges in the control flow graph which are not a part of the spanning tree. To determine the spanning tree for the control flow graph, the control flow graph is treated as a directed graph. A node is selected in the control flow graph as a starting point for a path (or thread of execution). A path is a sequence of unique nodes within the control flow graph. For each consecutive pair of nodes in a path, there exists an edge that can be followed in the direction of the edge from the first node in the pair to the second node.

Beginning with a selected starting point node, the control flow graph is traversed to determine which nodes and edges are part of a path. After determining which nodes and edges are part of the path, another node is selected as a starting node for a second path and the control flow graph is traversed to determine which nodes are part of the second path. These steps are repeated until every node in the control flow graph is determined to be part of a path. The combined paths create a spanning tree. Those edges in the control flow graph which are not a part of the spanning tree are selected as instrumentation points.

Instrumentation code containing a counter is added at the location represented by each instrumentation point. When the computer program is executed, the instrumentation code is executed. The instrumentation code records execution information for an instrumented block, such as how many times the block is executed. This execution information, along with the direction specified in the control flow graph, is then used in conjunction with the principles of Kirchhoff's electrical current law to determine the execution information for the non-instrumented blocks.

DETAILED DESCRIPTION OF THE INVENTION

A preferred embodiment of the present invention provides a method and computer system for selecting instrumentation points in a computer program. An instrumentation point is an location within the computer program at which instrumentation code is inserted. According to the present invention, every computer program is made up of one or more identifiable code portions such as functions, procedures, routines, or basic blocks. Every code portion is a potential instrumentation point. The present invention provides a method for selecting a minimal number of instrumentation points. When instrumentation code is inserted at a selected instrumentation point, i.e., within a code portion, and the code portion is accessed during execution of the computer program, the inserted instrumentation code will cause execution information to be recorded for the code portion. Execution information preferably includes how many times the code portion is accessed during execution of the computer program. The recorded execution information may then be used to calculate execution information for the code portions which are not selected as instrumentation points, thereby eliminating the need to add instrumentation code to every code portion.

For purposes of this detailed description, a "basic block" is a series of one or more machine instructions having one and only one entrance instruction, i.e., where control enters the block, and one and only one exit instruction, i.e., where control exits the block. A "control flow graph" is a well-known structure for representing the flow of execution between basic blocks. A control flow graph is a directed graph in which each node of the graph represents a basic block. There is a directed edge from a block B1 to a block B2 if block B2 can immediately follow block B1 in some execution sequence. In other words, there is a directed edge from block B1 to block B2 (1) if the last instruction, also known as the exit instruction, of block B1 is a conditional or unconditional jump to the first instruction, also known as the entrance instruction, of block B2, or (2) if block B2 immediately follows block B1 in the order of the program and block B1 does not end in an unconditional jump instruction.

Figure 1:
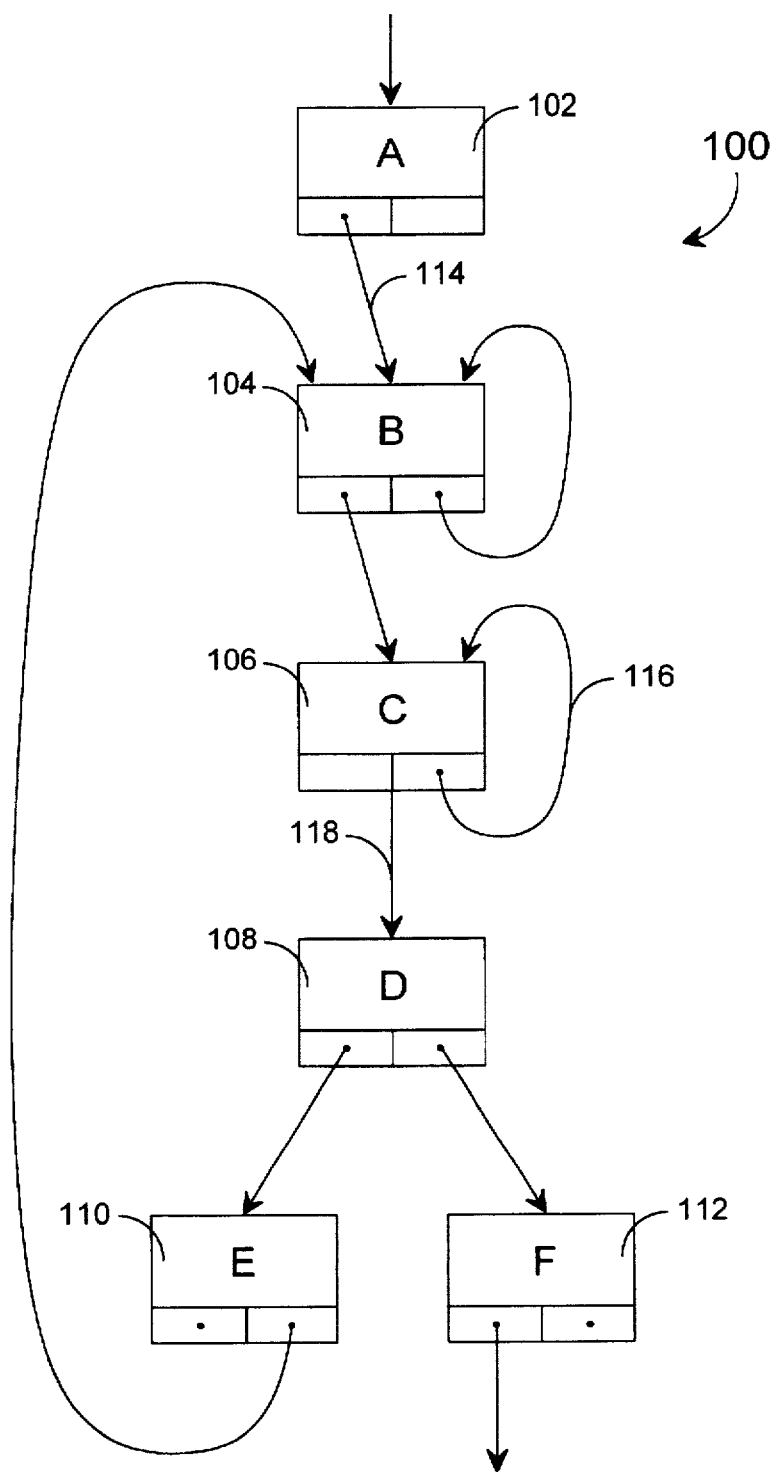
FIG. 1 is a block diagram of a conventional control flow graph for a selected sequence of instructions.

FIG. 1 is a block diagram of a conventional control flow graph 100 for an illustrative group of basic blocks. The instructions that make up the basic blocks are shown below in Table A. For ease in explanation, the instructions are in intermediate code rather than machine instructions.

TABLE A

| | |
|---|---|
| A | (1) i:=m-1 |
| | (2) j:=n |
| | (3) $t_1$:=4*n |
| | (4) v:=a[$t_1$] |
| B | (5) i:=i+1 |
| | (6) $t_2$:=4*i |
| | (7) $t_3$:=a[$t_2$] |
| | (8) if $t_3$<v goto B |
| C | (9) j:=j-1 |
| | (10) $t_4$:=4*j |
| | (11) $t_5$:=a[$t_4$] |
| | (12) if$t_5$>v goto C |
| D | (13) if i>=j goto F |
| E | (14) $t_6$:=4*i |
| | (15) x:=a[$t_6$] |
| | (16) $t_7$:=4*i |
| | (17) $t_8$:=4*j |
| | (18) $t_9$:=a[$t_8$] |
| | (19) a[$t_7$]:=$t_9$ |
| | (20) $t_{10}$:=4*j |
| | (21) a[$t_{10}$]:=x |
| | (22) goto B |
| F | (23) $t_{11}$:=4*i |
| | (24) x:=a[$t_{11}$] |
| | (25) $t_{12}$:=4*i |
| | (26) $t_{13}$:=4*n |
| | (27) $t_{14}$:=a[$t_{13}$] |
| | (28) a[$t_{12}$]:=$t_{14}$ |
| | (29) $t_{15}$:=4*n |
| | (30) a[$t_{15}$]:=x |

The instructions shown above in Table A have been divided into six blocks: block A contains instructions (1)–(4); block B contains instructions (5)–(8); block C contains instructions (9)–(12); block D contains instruction (13); block E contains instructions (14)–(22); and block F contains instructions (23)–(30).

Referring to FIG. 1, the control flow graph 100 includes six nodes 102, 104, 106, 108, 110, and 112, one node for each basic block identified above in Table A. The exit instruction for each block determines which block will be next in the flow of execution. For example, block A in Table A includes the exit instruction "v:=a[$t_1$]." This instruction indicates a fall through to the entrance instruction of block B. This flow of execution is represented by edge 114 from node 102 to node 104 in the control flow graph 100. Block B is said to be the "follower" of block A. As a further example, code block C includes the exit instruction "if $t_5$>v goto C." If the condition is true, then the flow of execution jumps to the entrance instruction of block C; if the condition is false, then the instruction within block D is executed. The flow of execution from the exit instruction of block C to the entrance instruction of block C is represented by edge 116 from node 106 back to node 106 in the control flow graph 100. The flow of execution from the exit instruction of block C to the entrance instruction of block D is represented by edge 118 between node 106 and node 108 in the control flow graph 100. Block C is said to be the "target" of block C, while block D is said to be the "follower" of block C. The generation of a control flow graph is described in more detail in A. AHO, R. SETHI, J. ULLMAN, *COMPILERS, PRINCIPLES, TECHNIQUES, AND TOOLS* (1986), which is hereby incorporated by reference.

Figure 2:
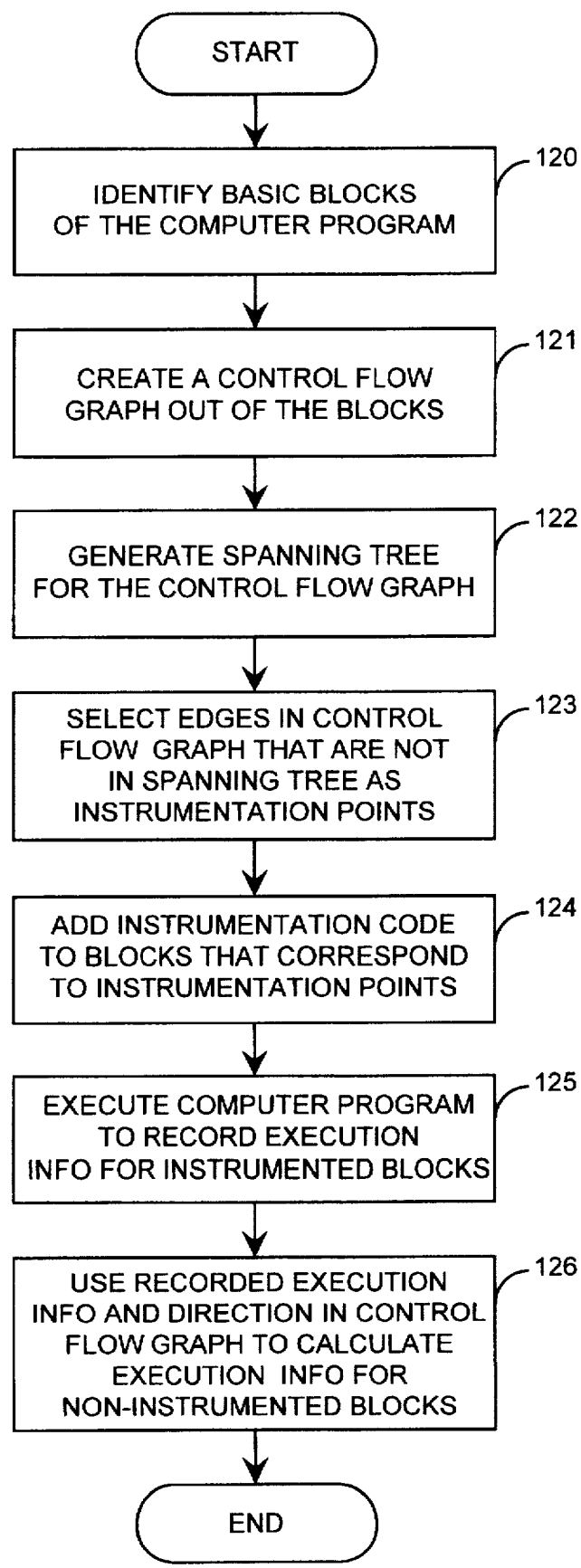
FIG. 2 is an overview flow diagram of a method for recording execution information for selected instrumentation points in a computer program and then using the recorded execution information to calculate execution information for every basic block in the computer program in accordance with a preferred embodiment of the present invention.

FIG. 2 is an overview flow diagram of a method for recording execution information for selected instrumentation points in a computer program and then using the recorded execution information to calculate execution information for every basic block in the computer program in accordance with a preferred embodiment of the present invention. The method includes identifying the basic blocks that make up the computer program (step 120), creating a control flow graph for the basic blocks (step 121), generating a spanning tree for the control flow graph (step 122), selecting as instrumentation points edges from the control flow graph which are not a part of the spanning tree (step 123), inserting instrumentation code at the selected instrumentation points (step 124), executing the computer program so that the inserted instrumentation code records how many times each instrumentation point is accessed (step 125), and then using the recorded execution information and the direction specified in the control flow graph to calculate execution information for the basic blocks which were not selected as instrumentation points (step 126). This method is explained in more detail with reference to FIGS. 3–9B.

Figure 3:
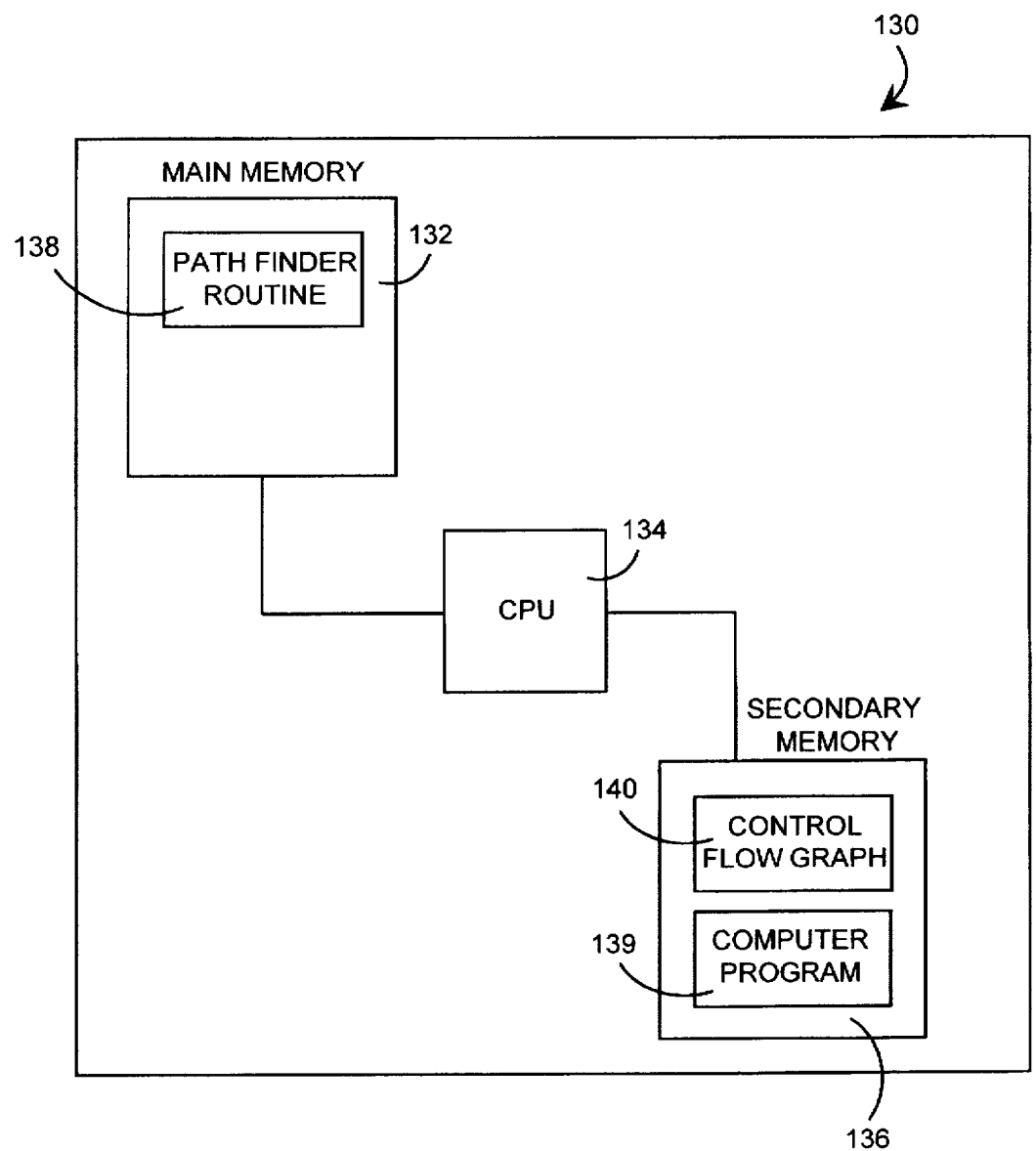
FIG. 3 is a block diagram of a computer system in accordance with a preferred embodiment of the present invention.

FIG. 3 is a block diagram of a computer system 130 configured to implement a preferred embodiment of the present invention. The computer system 130 includes a main memory 132, a central processing unit 134, and a secondary memory 136. A computer program 139 and a corresponding control flow graph 140 for the computer program 139 are stored in the secondary memory 136. The control flow graph 140 is created using a conventional control flow graph routine (not shown). A Span_Tree routine 138 provided by the present invention is loaded into to the main memory 132 to be executed. The Span_Tree routine 138 receives as input the control flow graph 140, traverses the nodes and edges in the control flow graph 140 to determine paths, and then outputs a spanning tree for the control flow graph 140. A spanning tree is an acyclic tree formed from all of the nodes and selected edges of the control flow graph 140.

Figure 4:
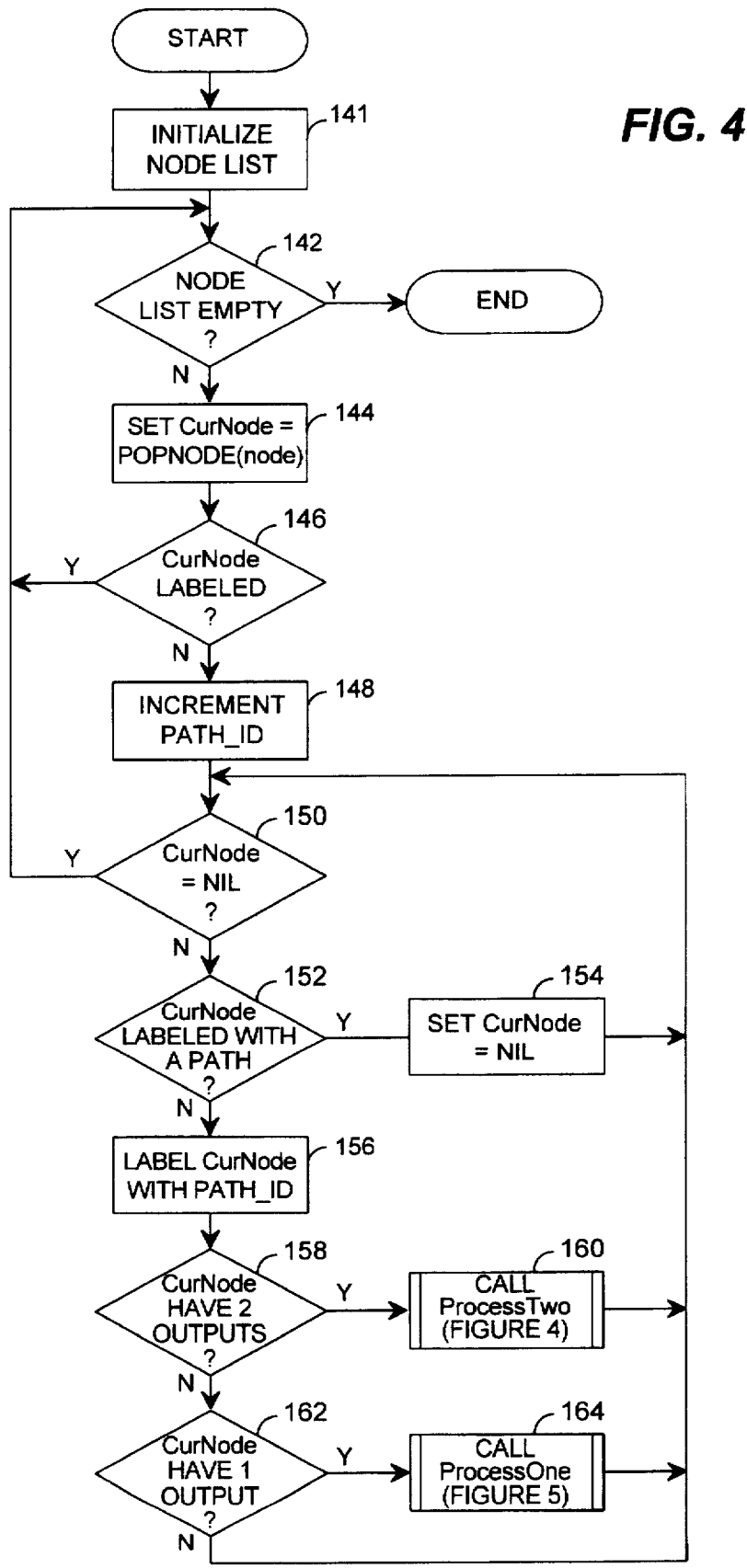
FIG. 4 is a flow diagram of a method used to label nodes and edges in a control flow graph with a path identifier in accordance with a preferred embodiment of the present invention.

FIG. 4 is a flow diagram of the Span_Tree routine 138 in accordance with a preferred embodiment of the present invention. The Span_Tree routine traverses every node in the control flow graph 140, and then labels every node and selected edges in the control flow graph 140 with a path identifier. A path identifier is a value associated with nodes and edges that indicates to which path the node or edge is connected. In step 141 of FIG. 4, the Span_Tree routine initializes a node list by pushing a pointer to the root node of the control flow graph 140 onto the node list. The node list is used to defer processing of nodes which may be the starting node of a path. Preferably, the node list is a data structure in which pointers to nodes are "pushed" onto the top of the node list and "popped" from the bottom of the node list. In step 142, the Span_Tree routine determines whether the node list is empty. If the node list is empty, then the Span_Tree routine terminates. If the node list is not empty, then in step 144 the Span_Tree routine pops a node off of the node list and sets a pointer CurNode to point to the popped node. The pointer CurNode is used to keep track of the current node that is being processed.

In step 146, the Span_Tree routine determines whether CurNode is labeled with a path identifier. If CurNode is labeled with a path identifier, then the Span_Tree routine loops back to step 142. Step 146 prevents a node that has already been labeled with a path identifier from being re-labeled. If CurNode is not labeled with a path identifier, then in step 148 the Span_Tree routine increments a variable Path_ID. The variable Path_ID is used to keep track of a current path identifier. Path_ID is initially set to zero.

In step 150, the Span_Tree routine determines whether CurNode contains a nil value. A nil value stored in CurNode will cause the Span_Tree routine to loop back to step 142. A nil value is stored in CurNode by the Span_Tree routine when the end of a path is encountered. If the Span_Tree routine determines that CurNode does not contain a nil value, then in step 152 the Span_Tree routine determines whether CurNode is labeled with a path identifier. This check for a path identifier in step 152 will identify when a different, already-labeled path is encountered, thereby identifying the end of the current path. If CurNode is labeled with a path identifier, then in step 154 the Span_Tree routine sets CurNode equal to nil and loops to step 150. After step 150 is executed, another node will be popped off of the node list in step 142, if any more nodes are stored in the node list. If CurNode is not labeled with a path identifier (step 152), then in step 156 the Span_Tree routine labels CurNode with the value stored in Path_ID.

In step 158, if the Span_Tree routine determines that CurNode has two output edges, then in step 160 the Span_Tree routine calls a routine ProcessTwo. The routine ProcessTwo is described below in more detail with reference to FIG. 5. Generally, the ProcessTwo routine determines which one of the two output edges, if any, should be labeled with the value stored in Path_ID. That is, the ProcessTwo routine determines with which output edge of CurNode to continue the current path. The destination node of the output edge will be labeled with the value stored in Path_ID and a pointer to the destination node of the other output edge will be pushed onto the node list for later processing. Any node on the node list is potentially a starting node for a new path. After the ProcessTwo routine executes, the Span_Tree routine loops back to step 150.

If the Span_Tree routine determines in step 158 that CurNode does not have two output edges, then in step 162 the Span_Tree routine determines whether CurNode has one output edge. If CurNode has one output edge, then in step 164 the Span_Tree routine calls a routine ProcessOne. The ProcessOne routine is described in more detail below with reference to FIG. 6. Generally, the ProcessOne routine determines whether the destination node of the output edge should be labeled with the same path identifier as CurNode, that is, is it on the same path as CurNode. After the ProcessOne routine executes, the Span_Tree routine loops back to step 150.

If the Span_Tree routine determines in step 162 that CurNode has zero output edges or more than two output edges, then the Span_Tree routine loops back to step 150 to terminate the current path. More than two output edges indicates the presence of a statement with multiple targets, such as a case statement. The current path is terminated by storing a nil value in CurNode in step 154, after determining in step 152 that CurNode was already labeled with a path identifier. Storing a nil value in CurNode will cause the Span_Tree routine to loop back to step 142. The Span_Tree routine repeats steps 142-164 until every node in the control flow graph is labeled with a path identifier.

Figure 5:
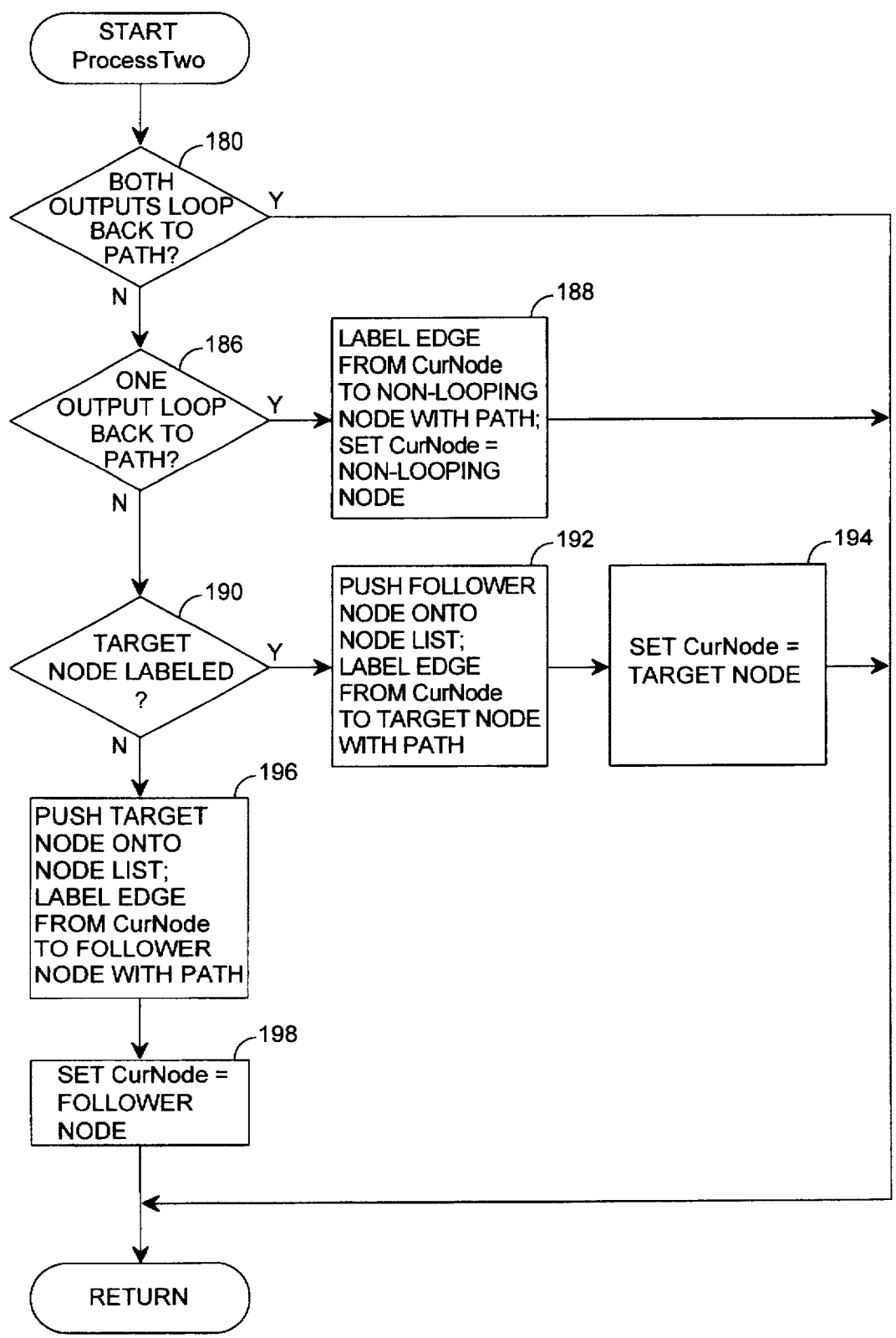
FIG. 5 is a flow diagram of a method used to determine the direction of a path when a node in a control flow graph has two successor nodes in accordance with a preferred embodiment of the present invention.

FIG. 5 is a flow diagram of the ProcessTwo routine. The ProcessTwo routine analyzes the destination nodes of the two output edges of CurNode to determine which node, if any, should be labeled with the current path identifier. For purposes of this detailed description, these nodes are known as target or follower nodes. The target node represents the block of code that is the destination of a branch or jump instruction of the exit instruction of the current node. The follower node represents the block of code that is the "fall through" block; that is, no branch or jump instruction is needed to access the block.

In step 180 of FIG. 5, the ProcessTwo routine determines whether the target node and the follower node are already labeled with the same path identifier as CurNode, that is, whether both output edges of CurNode loop back to the current path. If both output edges of CurNode loop back to the current path, then control returns to the Span_Tree routine at step 150 in FIG. 4. Because neither output edge is labeled, both edges will be selected as instrumentation points. If it is determined that both output edges of CurNode do not loop back to the current path (step 180), then in step 186 the ProcessTwo routine determines whether the target node or the follower node of CurNode loop back to the current path. For purposes of this discussion, a node that loops back to the current path is referred to as a looping node. If either the target node or the follower node is a looping node, then in step 188 the output edge from CurNode to the non-looping node of CurNode is labeled with the value stored in Path_ID. Additionally, in step 188 CurNode is set to point to the non-looping node. After step 188, control is returned to the Span_Tree routine at step 150 in FIG. 4.

If it is determined that neither the target node nor the follower node of CurNode loops back to the current path, then in step 190 the ProcessTwo routine determines whether the target node was already labeled with a path identifier. If it is determined that the target node is labeled with a path identifier, then in step 192 a pointer to the follower node of CurNode is pushed onto the node list and the edge between CurNode and the target node is labeled with the value stored in Path_ID. In step 194, a pointer to the target node is stored in CurNode. After step 194, control is returned to the Span_Tree routine at step 150 in FIG. 4. [Note: In step 152, the Span_Tree routine will determine that CurNode was already labeled with a path identifier so the Span_Tree routine will terminate the current path.]

If it is determined in step 190 that the target node of CurNode is not labeled with a path identifier, then in step 196 a pointer to the target node of CurNode is pushed onto the node list and the edge from CurNode to the follower node of CurNode is labeled with the value stored in Path_ID. Step 190 occurs because in a preferred embodiment of the present invention, a path follows the follower nodes, if possible. Of course, maintaining a path using the target nodes is acceptable in an alternate embodiment of the present invention. In step 198, CurNode is set to point to the follower node of CurNode. After step 198, control is returned to the Span_Tree routine at step 150 in FIG. 4.

Figure 6:
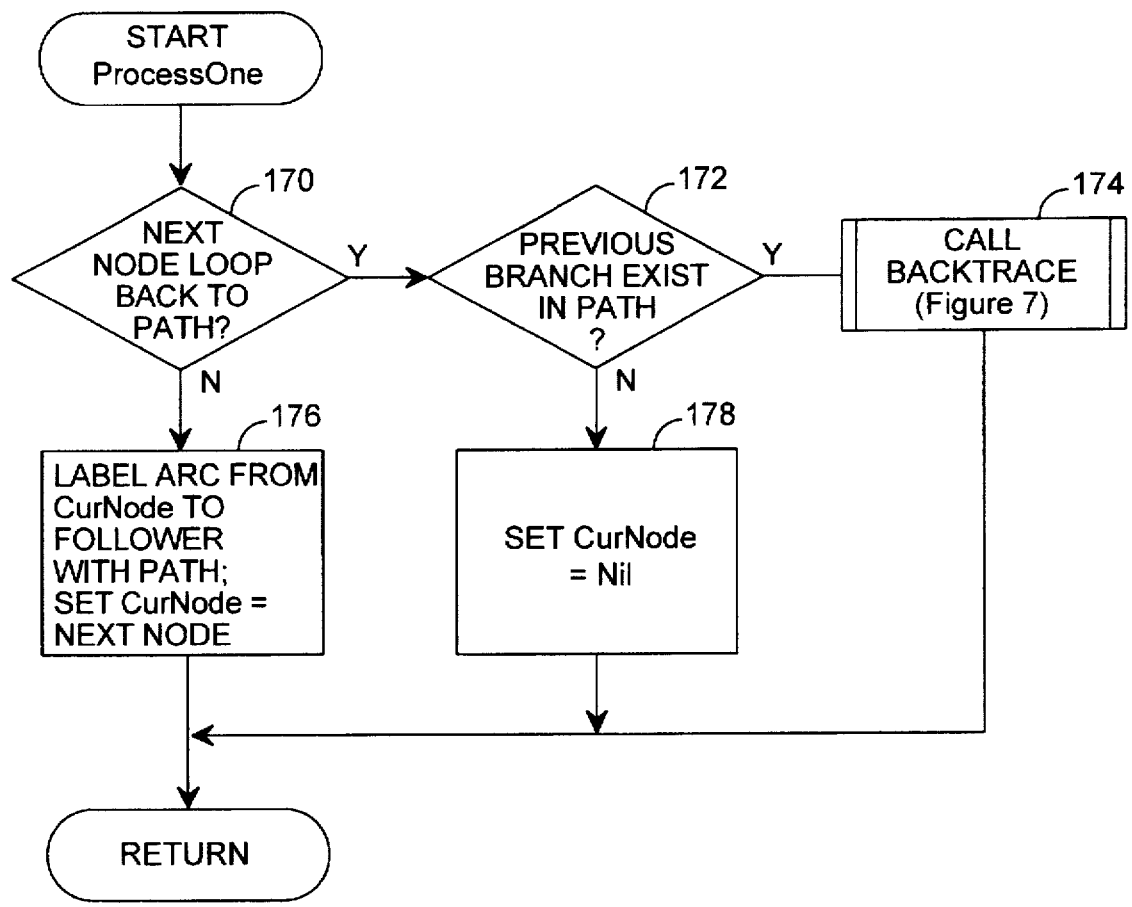
FIG. 6 is a flow diagram of a method used to determine the direction of a path when a node in a control flow graph has only one successor node in accordance with a preferred embodiment of the present invention.

FIG. 6 is a flow diagram of the ProcessOne routine. The ProcessOne routine determines whether the current path should include the next node after CurNode. In step 170, the ProcessOne routine determines whether the next node after CurNode was already labeled with the current path identifier. If the next node was already labeled with the current path identifier, then, in step 172, the ProcessOne routine determines whether a previous node having two output edges exists on the current path. This node is referred to as the last branching node. The last branching node is located so that the path can be redirected at that point to avoid the loop detected in step 170. A loop is avoided because it makes an imperfect spanning tree. Recall that in a spanning tree, there should be only one path to every node. The current path is redirected by clearing the path identifiers from the nodes and edges in between the last branching node and CurNode, including CurNode. If no last branching node exists, then, in step 178, the ProcessOne routine stores a nil value in CurNode. Storing a nil value in CurNode will cause the current path to be terminated when control is returned to the Span_Tree routine. If a last branching node does exist, then, in step 174, the ProcessOne routine calls a BackTrace routine, which causes the redirection of the current path from the last branching node. The BackTrace routine is described in more detail below with reference to FIG. 7. If the next node is not already labeled with the same path identifier as CurNode (step 170), then, in step 176, the edge from CurNode to the next node is labeled with the value stored in Path_ID, and a pointer to the next node is stored in CurNode. After steps 176 and 178, control is returned to the Span_Tree routine at step 150 in FIG. 4.

Figure 7:
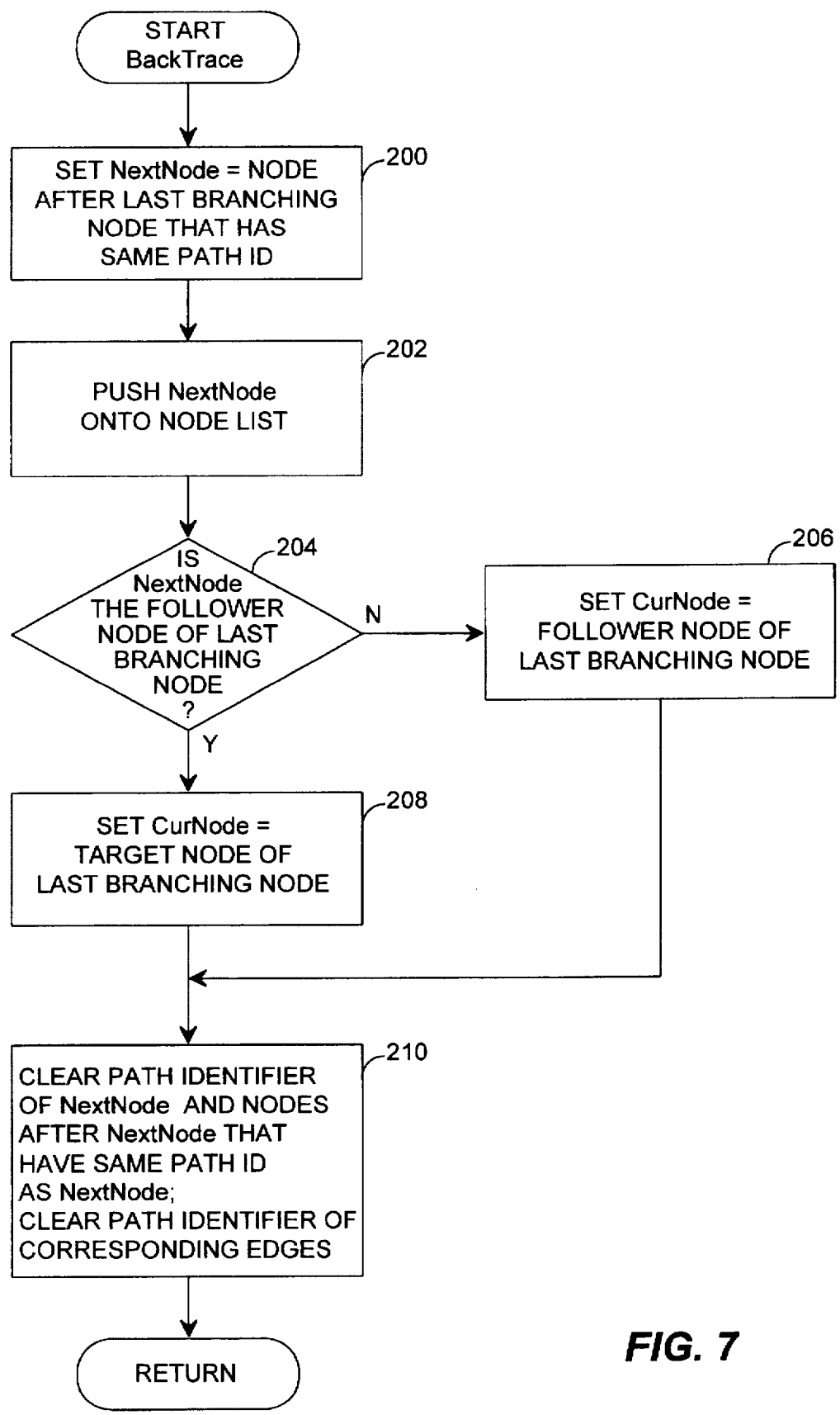
FIG. 7 is a flow diagram of a BackTrace routine in accordance with a preferred embodiment of the present invention.

FIG. 7 is a block diagram of the BackTrace routine. The BackTrace routine is called by the ProcessOne routine when the next node loops back to the current path. As described briefly above, when the next node loops back to the current path, the current path is redirected from the last branching node to avoid the loop. The input to the BackTrace routine is a pointer to the last branching node before CurNode. In step 200, the BackTrace routine stores a pointer to a node immediately following the last branching node and having the same path identifier as the last branching node in a variable NextNode. In step 202, NextNode is pushed onto the node list. In step 204, it is determined whether NextNode is the follower node or the target node of the last branching node. If NextNode is the target node, then in step 206 a pointer to the follower node is stored in CurNode. If it is determined that NextNode is the follower node of the last branching node, then in step 208 a pointer to the target node is stored in CurNode. After steps 206 and 208, in step 210 the path identifiers of NextNode and the nodes and edges after NextNode that have the same path identifier as Next-Node are cleared. After step 210, control is returned to the Span_Tree routine at step 150 in FIG. 4.

Figure 8A:
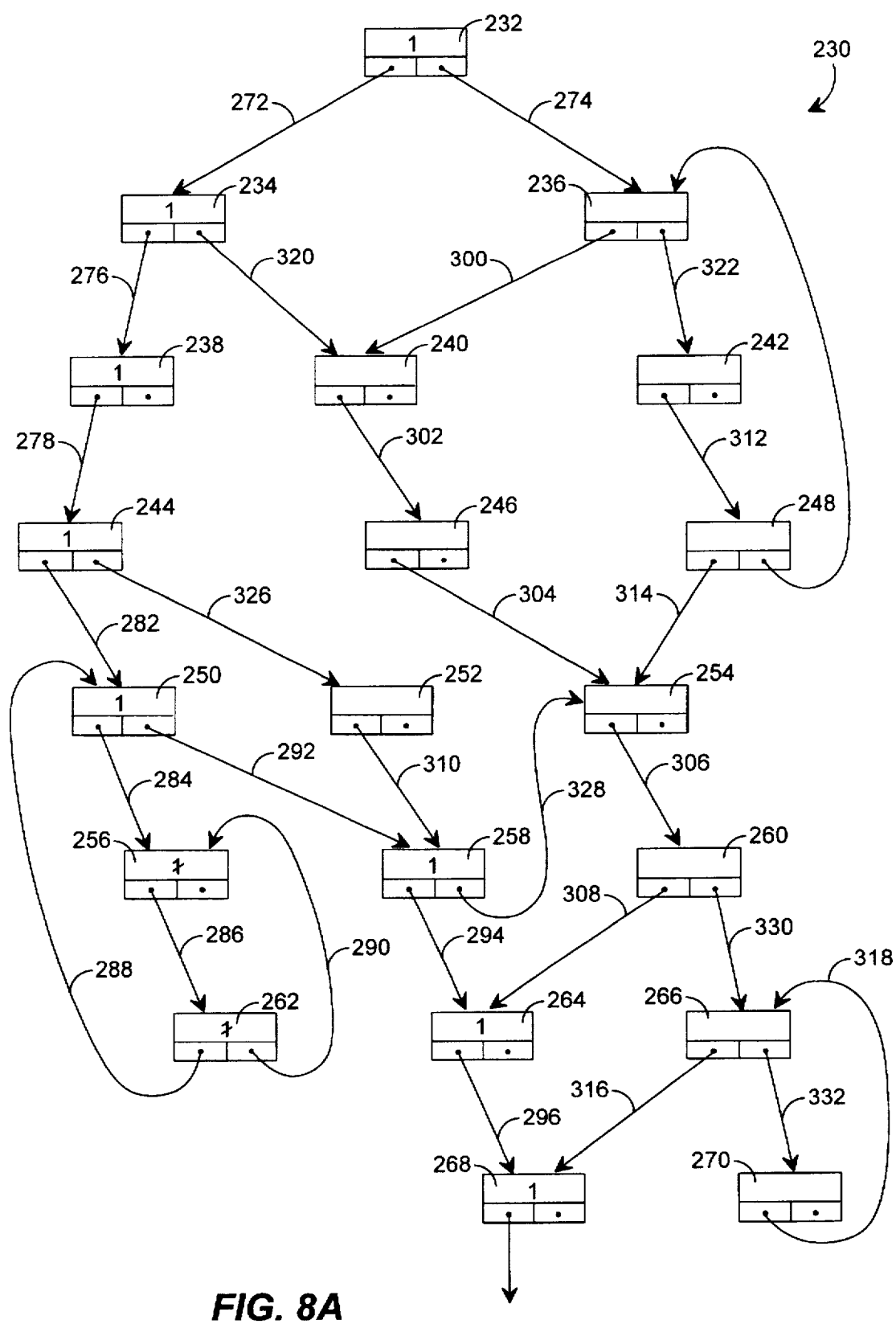
FIG. 8A is a block diagram of an illustrative control flow graph.

After describing the Span_Tree routine in detail, it is helpful to trace through the steps of the routine using an illustrative control flow graph as input. FIG. 8A is a block diagram of an illustrative control flow graph 230. The control flow graph 230 is designed to represent a portion of a computer program. Those skilled in the art will appreciate that a computer program may contain multiple control flow graphs. For purposes of this example, every node in the control flow graph 230 has at most two output edges. However, those skilled in the art will appreciate that a basic block in a computer program may branch to more than two different basic blocks. A switch statement in the C programming language that contains multiple case statements is an example of when an instruction branches to more than two basic blocks.

Referring again to FIG. 8A, the control flow graph 230 has a root node 232. The Span_Tree routine initializes a node list by pushing a pointer to the root node 232 and any other root nodes of other control flow graphs onto the node list (step 140, FIG. 4). The Span_Tree routine then determines whether the node list is empty (step 142). The node list is not empty, therefore the Span_Tree routine pops node 232 off of the node list and stores a pointer to node 232 in CurNode (step 144). The Span_Tree routine then determines whether CurNode is labeled with a path identifier (step 146). Node 232 is not labeled with a path identifier, therefore the Span_Tree routine increments a variable Path_ID (step 148). Because the variable Path_ID is initially set to zero, Path_ID now contains the value "1." The Span_Tree routine then determines whether CurNode contains a nil value (step 150). CurNode does not contain a nil value, therefore the Span_Tree routine determines whether CurNode is labeled with a path identifier (step 152). CurNode is not labeled with a path identifier, therefore the Span_Tree routine labels CurNode with the value stored in Path_ID (step 156). Node 232 is now labeled with the path identifier "1."

Next, the Span_Tree routine determines whether CurNode has two output edges (step 158). Because node 232 has an output edge 272 to a follower node 234 and an output edge 274 to a target node 236, the Span_Tree routine calls the routine ProcessTwo (step 160). For purposes of this example, the rightmost node is the target node and the leftmost node is the follower node. The ProcessTwo routine determines that neither the follower node 234 nor the target node 236 have already been labeled with the current path identifier "1" (steps 180 and 186, FIG. 5). The ProcessTwo routine then determines whether the target node 236 has already been labeled with a path identifier (step 190). Because the target node 236 has not already been labeled with a path identifier, the ProcessTwo routine pushes a pointer to the target node 236 onto the node list and labels the edge 272 with the value stored in Path_ID. Edge 272 is now labeled with the value "1." The ProcessTwo routine stores a pointer to the follower node 234 in CurNode (step 198).

A pointer to node 234 is now stored in CurNode. Node 234 has an edge 276 to a follower node 238 and an edge 320 to a target node 240. The Span_Tree routine labels node 234 with the path identifier "1" (step 156, FIG. 4) and the ProcessTwo routine is called (step 160). The ProcessTwo routine pushes a pointer to the target node 240 onto the node list and labels the edge 276 with the path identifier "1" (step196, FIG. 5). A pointer to the follower node 238 is then stored in CurNode (step 198).

The Span_Tree routine then determines whether CurNode has already been labeled with a path identifier (step 152, FIG. 4). After determining that CurNode has not already been labeled with a path identifier, the Span_Tree routine labels CurNode with the path identifier "1" (step 156). Because node 238 has only one output edge—edge 278, the Span_Tree routine calls the routine ProcessOne routine (step 164). The ProcessOne routine determines whether the edge 278 loops back to the current path (step 170, FIG. 6). Because edge 278 does not loop back to the current path, the ProcessOne routine labels edge 278 with the path identifier "1" and stores a pointer to node 244 in CurNode (step 174). The Span_Tree routine continues in a similar manner, labeling nodes 244, 250, 256, 262 and edges 282, 284, 286 with the path identifier "1."

When a pointer to node 262 is stored in CurNode, the Span_Tree routine calls the routine ProcessTwo because node 262 has two output edges, edge 288 and edge 290. The ProcessTwo routine determines that both output edges loop back to the current path (step 180, FIG. 5). The path identified as "1" terminates with node 262 because node 262 contains two output edges that both loop back to the current path.

After path "1" is terminated, the Span_Tree routine pops a new pointer off of the node list and stores it in CurNode. In this example, a pointer to node 236 is the next pointer on the node list. The Span_Tree routine then labels the remaining nodes in the control flow graph 230.

Figure 8B:
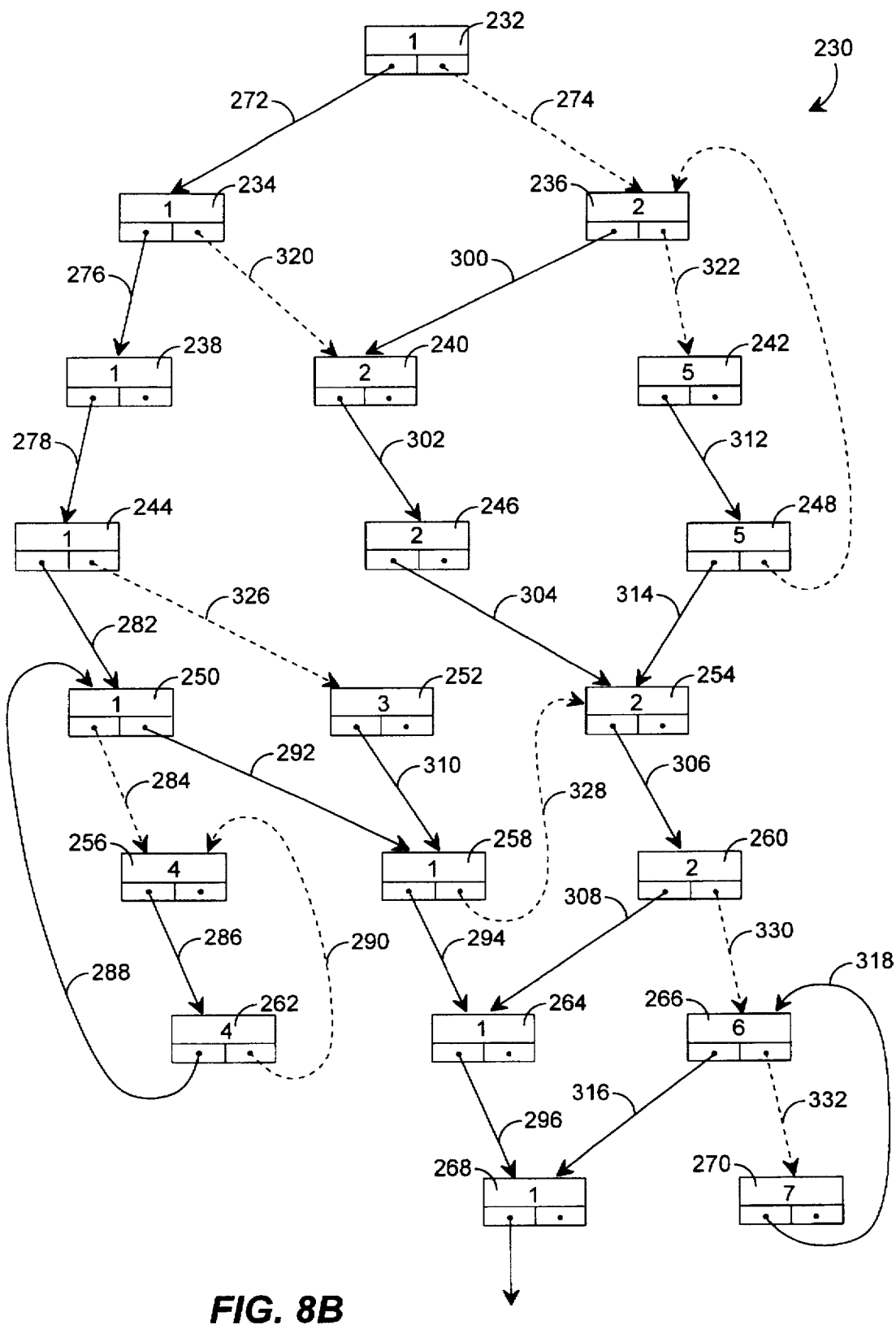
FIG. 8B is a block diagram of a spanning tree for the control flow graph shown in FIG. 8A in accordance with a preferred embodiment of the present invention.

FIG. 8B is a block diagram of the control flow graph 230 of FIG. 8A, including path identifiers for each node. Nodes 232, 234, 238, 244, 250, 256, and 262, along with edges 272, 276, 278, 282, 284, and 286 are labeled with the path identifier "1." Nodes 236, 240, 246, 254, 260, 264, and 268, along with edges 300, 302, 304, 306, and 296 are labeled with the path identifier "2." Nodes 252 and 258, and edges 310 and 294 are labeled with the path identifier "3." Nodes 242 and 248, along with edges 312 and 314 are labeled with the path identifier "4." Node 266 and edge 316 are labeled with the path identifier "5." Node 270 and edge 318 are labeled with the path identifier "6."

When combined, paths "1" through "6" form a spanning tree for the control flow graph 230. Edges 274, 284, 288, 290, 320, 322, 324, 326, 328, 330, and 332, shown in the block diagram of FIG. 8B as dashed arrows, are not labeled with a path identifier, and are therefore not a part of the spanning tree. These edges are selected as instrumentation points. In addition, edge 231 is selected an instrumentation point. Edge 231 represents an exit instruction from a "dummy" block. The exit instruction of the "dummy" block may be a jump instruction that initiates execution of the computer program represented by the control flow graph 230. Selecting these edges as instrumentation points means that instrumentation code will be added to the exit instructions represented by the selected edges.

Figure 9A:
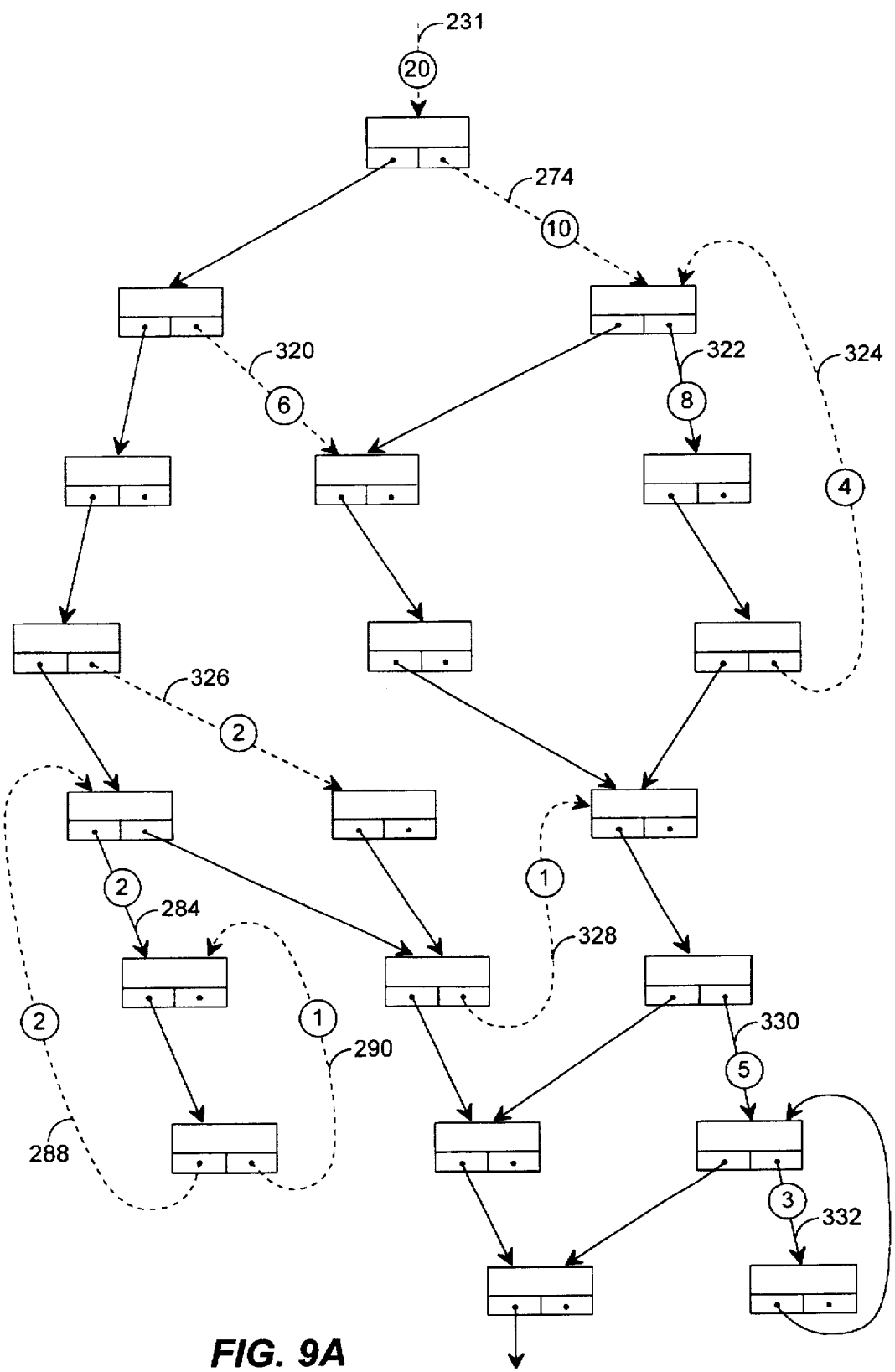
FIG. 9A is a block diagram of the control flow graph of FIGS. 7A-7B including illustrative execution information for each edge that was selected as an instrumentation point in accordance with a preferred embodiment of the present invention.

After instrumentation code is added to the computer program, the computer program is executed. During execution of the computer program, the instrumentation code records, among other things, each time an instrumented edge is executed. FIG. 9A is a block diagram of the control flow graph of FIG. 8A, including illustrative execution information for each edge that was selected as an instrumentation point. As described above, edges 231, 274, 284, 288, 290, 320, 322, 324, 326, 328, 330, and 332 were selected as instrumentation points. The illustrative execution information represents how many times an instrumented exit instruction was executed during execution of the computer program. The execution information for an instruction is represented as a "weight" of a corresponding edge. Edge 231 has a weight of 20; edge 274 has a weight of 10; edge 284 has a weight of 2; edge 288 has a weight of 2; edge 290 has a weight of 1; edge 320 has a weight of 6; edge 322 has a weight of 8; edge 324 has a weight of 4; edge 326 has a weight of 2; edge 328 has a weight of 1; edge 330 has a weight of 5; and edge 332 has a weight of 3.

Now that the weight of selected edges is known, the weight of every other edge can be determined using a variation of Kirchhoff's electrical current law and the direction specified within the control flow graph. Kirchhoff's electrical current law teaches that the algebraic sum of all the currents at any node in a circuit equals zero. Applying a principle similar to Kirchhoff's law to a control flow graph, we can say that the sum of edge weights at any node in a control flow graph equals zero. Direction must be specified in the control flow graph for this principle to work. For example, consider the node 232 in the control flow graph 230 of FIG. 9A. The weight of the input edge 231 of the node 232 was determined to be 20, and the weight of the exit edge 274 of the node 232 was determined to be 10. Therefore the weight of the output edge 272 must be 10. The weight of output edge 272 is calculated by subtracting the sum of the weights of the output edges from the sum of the weights of the input edges $[20-(10+x)=0; x=10]$.

Figure 9B:
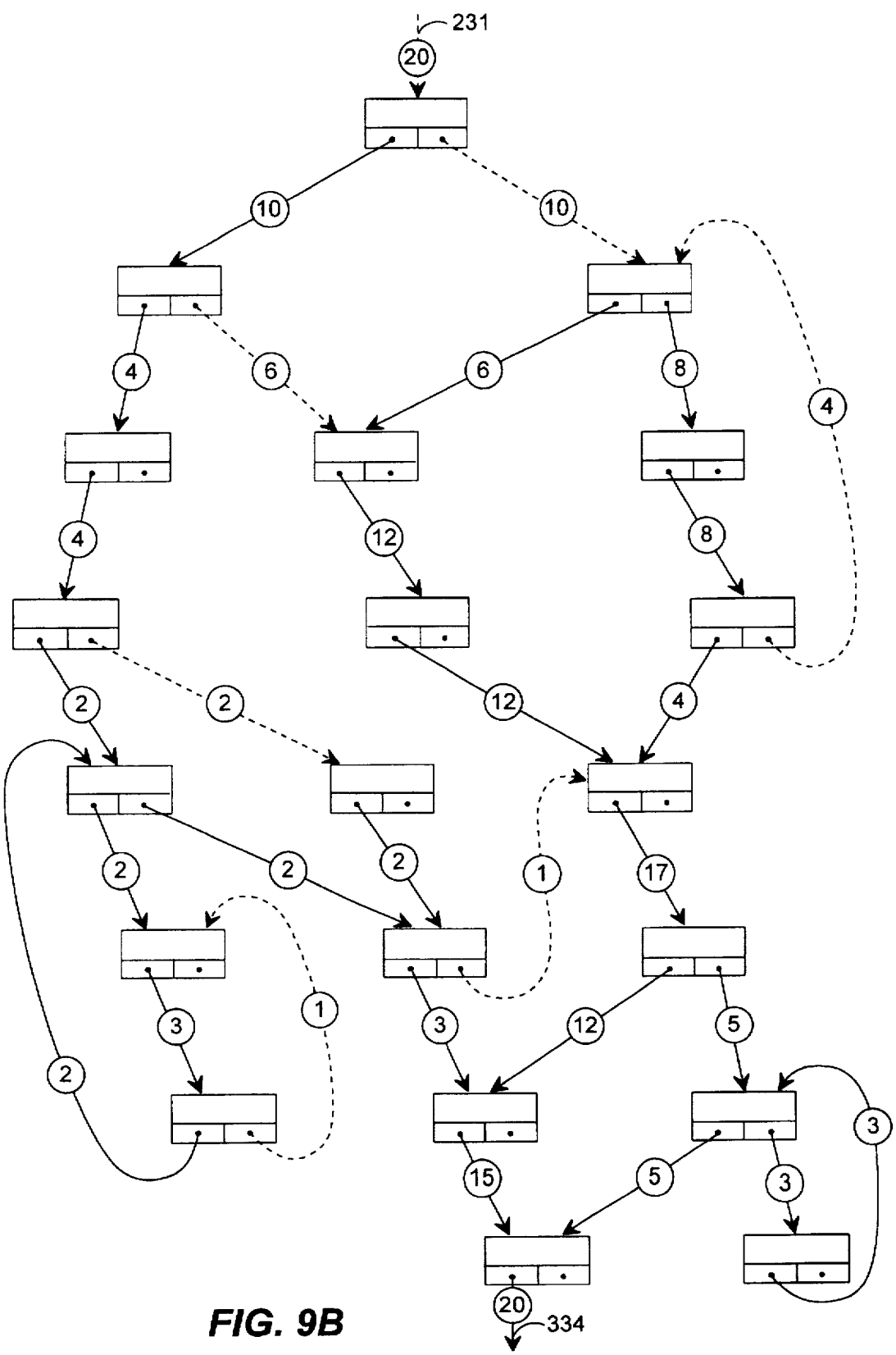
FIG. 9B is a block diagram of the control flow graph of FIG. 9A including calculated execution information for each edge based upon the illustrative execution information shown in FIG. 9A.

Applying this principle to the rest of the control flow graph 230, the weight of each edge can be determined. FIG. 9B is a block diagram of the control flow graph 230, including the weight of every edge. Note that the weight of the input edge 231 is equal to the weight of the output edge 334.

In an alternate embodiment of the present invention, at the start of the Span_Tree routine, every edge in the control flow graph is selected as an instrumentation point. The Span_Tree routine traverses the control flow graph to determine which instrumentation points will be "skipped." This alternate embodiment is presented below in Table B as a routine Alt_Span_Tree. A data structure CurNode is used to keep track of whether a node's follower node or target node is part of a current path. CurNode contains the following data fields: CurNode->Skip, CurNode->Label, CurNode->Type, CurNode->Follower, and CurNode->Target. When identifying a path through the control flow graph, this alternate embodiment examines the type of the exit instruction of a block rather than examining the number of output edges of a corresponding node.

TABLE B

```
Alt_Span_Tree

Initialize StartList
while (StartList is not empty)
    Initialize CurLabel
    Node = PopStartList()
    if (Node is Labeled) continue
    PushNode(Node)
    while (NodeList is not empty)
        Node = PopNodeList()
        if (Node is Labeled) continue
        CurLabel++
        LastBranch = NIL
        CurNode = Node
        while (CurNode is not NIL)
            if (CurNode is Labeled)
                CurNode = NIL
                break;
            CurNode->Label = CurLabel
            Switch (CurNode->Type)
                case BranchConditional:
                    DetermineSkip(CurNode->Follower, CurNode->Target)
                    break;
                case CallConditional:
                case Call:
                    if (CurNode->Follower != NIL)
```

TABLE B-continued

```
                        PushNode(CurNode->Follower)
                case Branch:
                    DetermineSkip(CurNode->Target, NIL)
                    break;
                case BranchConditionalIndirect:
                case FallThrough:
                    DetermineSkip(CurNode->Follower, NIL)
                    break;
                case CallConditionalIndirect:
                case CallIndirect:
                    if (CurNode->Follower != NIL)
                        PushNode(CurNode->Follower)
                    break;
                case BranchIndirect:
            endswitch
        endwhile
    endwhile
endwhile DetermineSkip(Node1, Node2)

Loop = DetermineLoop(Node1, Node2)
    switch (Loop)
        ParentNode = CurNode
        case NeitherLoop:
            if ((Node2 != NIL) && (Node2 is Labeled))
                PushNode(Node1)
                LastBranch = CurNode
                CurNode = Node2
                ParentNode->Skip = Node2
            else
                if (Node2 != NIL)
                    PushNode(Node2)
                    LastBranch = CurNode
                endif
                CurNode = Node1
                ParentNode->Skip = Node1
            endif
            break;
        case Node1Loop:
            if (N2 != NIL)
                LastBranch = CurNode
                CurNode = Node2
                ParentNode->Skip = Node2
            else
                CurNode = NIL
            endif
            break;
        case Node2Loop:
            LastBranch = CurNode
            CurNode = Node1
            ParentNode->Skip = Node1
            break;
        case BothLoop:
            If (LastBranch != NIL) BackTrace()
            break;
    return BackTrace()

PutNode(LastBranch->Skip)
    if (LastBranch->Skip = LastBranch->Follower)
        CurNode = LastBranch->Target
    else
        CurNode = LastBranch->Follower
    endif
    NextNode = LastBranch->Skip
    LastBranch->Skip = CurNode
    do
        NextNode->Label = 0
        PrevNode = NextNode
        NextNode = NextNode->Skip
        PrevNode->Skip = 0
    while (NextNode != NIL)
    LastBranch = NIL
    return
```

Although the present invention has been described in terms of a preferred embodiment, it is not intended that the invention be limited to this embodiment. Modifications within the spirit of the invention will be apparent to those skilled in the art; the scope of the present invention is defined by the claims which follow.

I claim:

1. In a computer system, a method for determining instrumentation points in a computer program comprising the steps of:
   a) creating a control flow graph for the computer program, the control flow graph including a plurality of nodes, each node connected to at least one other node by a directed edge;
   b) selecting a node of the control flow graph as a starting point for a path;
   c) beginning with the selected starting point node, following directed edges of the control flow graph in a directed manner to determine which nodes and edges are part of the path,
   d) after determining which nodes and edges are part of the path, repeating steps b) and c) until every node in the control flow graph is determined to be part of a path, whereby each node is part of only one path, and
   e) after every node in the control flow graph is determined to be part of a path, selecting as instrumentation points those edges in the control flow graph that are not determined to be part of one of the paths.

2. In a computer system, a method for determining which edges in control flow graph should be instrumented to obtain execution counts for each node in the control flow graph, the control flow graph including a plurality of nodes, each node connected to at least one other node by a directed edge, the method comprising the steps of:
   a) selecting a node in the control flow graph as a starting point for a thread of execution;
   b) beginning with the selected node, following the directed edges of the control flow graph in a directed manner to determine which nodes and edges are part of the thread of execution;
   c) after determining which nodes and edges are part of the thread of execution, repeating steps (a) and (b) until every node in the control flow graph is part of a thread of execution, whereby each node is part of only one thread of execution; and
   d) after all of the threads of execution in the control flow graph are identified, selecting those edges in the control flow graph that are not part of one of the determined threads of execution for instrumentation.

3. The method of claim 2 wherein the control flow graph is directed such that each node has an entrance edge and an exit edge, and wherein the step of traversing the control flow graph includes the steps of:
   after selecting the node in the control flow graph as a starting point for the thread of execution, determining which one of the exit edges should be part of the thread of execution; and
   selecting a node in the control flow graph that has the determined exit edge as an input edge to be part of the thread of execution.

4. The method of claim 3 wherein the step of determining which one of the exit edges should be part of the thread of execution includes the steps of:
   determining how many exit edges are associated with the node;
   when two exit edges are associated with the node, determining whether either of the exit edges are an entrance edge for a node that is part of the thread of execution;
   when both exit edges are an entrance edge for a node that is part of the thread of execution, determining that neither exit edge should be part of the thread of execution; and
   when one exit edge is an entrance edge for a node that is part of the thread of execution, back tracking on the thread of execution until a node is encountered that has two exit edges.

5. A computer-readable storage device containing instructions for controlling a computer system to determine which edges in control flow graph should be instrumented to obtain execution counts for each node in the control flow graph, the control flow graph including a plurality of nodes, each node connected to at least one other node by a directed edge, by a method comprising the steps of:
   a) selecting a node in the control flow graph as a starting point for a thread of execution;
   b) beginning with the selected node, following the directed edges of the control flow graph in a directed manner to determine which nodes and edges are part of the thread of execution;
   c) after determining which nodes and edges are part of the thread of execution, repeating steps (a) and (b) until every node in the control flow graph is part of a thread of execution, whereby each node is part of only one thread of execution; and
   d) after all of the threads of execution in the control flow graph are identified, selecting those edges in the control flow graph that are not part of one of the determined threads of execution for instrumentation.

6. The computer-readable medium of claim 5 wherein the control flow graph is directed such that each node has an entrance edge and an exit edge, and wherein the step of traversing the control flow graph includes the steps of:
   after selecting the node in the control flow graph as a starting point for the thread of execution, determining which one of the exit edges should be part of the thread of execution; and
   selecting a node in the control flow graph that has the determined exit edge as an input edge to be part of the thread of execution.

7. The computer-readable medium of claim 6 wherein the step of determining which one of the exit edges should be part of the thread of execution includes the steps of:
   determining how many exit edges are associated with the node;
   when two exit edges are associated with the node, determining whether either of the exit edges are an entrance edge for a node that is part of the thread of execution;
   when both exit edges are an entrance edge for a node that is part of the thread of execution, determining that neither exit edge should be part of the thread of execution; and
   when one exit edge is an entrance edge for a node that is part of the thread of execution, back tracking on the thread of execution until a node is encountered that has two exit edges.

8. A method in a computer system for identifying instrumentation points for a computer program, the computer program represented by a control flow graph having nodes and edges, each node representing a basic block of the computer program, each edge representing flow control from one basic block to another basic block, the method comprising:
   designating a root node of the control flow graph to be visited; and repeating the following until all nodes designated to be visited have already been visited,
- visiting a node designated to be visited that has not yet been visited; and
- repeat the following until the node currently being visited has already been visited,
  - when an output edge from the currently visited node that does not point to a node that has already been visited,
    - selecting that output edge;
    - identifying the selected output edge as not to be instrumented;
  - when a non-selected output edge points to a node that has not yet been visited, designating the node pointed to by the non-selected edge as to be visited; and
  - visiting the node pointed to by the selected output edge wherein all edges other than those identified as not to be instrumented are instrumented.

9. The method of claim 8 wherein the designating of a node to be visited adds the node to a node list.

* * * * *